United States Patent
Byun et al.

(10) Patent No.: US 12,243,516 B2
(45) Date of Patent: Mar. 4, 2025

(54) ELECTRONIC DEVICE AND CONTROL METHOD THEREFOR

(71) Applicant: Samsung Electronics Co., Ltd., Suwon-si (KR)

(72) Inventors: Dongnam Byun, Suwon-si (KR); Seohee Kim, Suwon-si (KR); Hyunhan Kim, Suwon-si (KR); Yujin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 17/255,605

(22) PCT Filed: Aug. 30, 2019

(86) PCT No.: PCT/KR2019/011135
§ 371 (c)(1),
(2) Date: Dec. 23, 2020

(87) PCT Pub. No.: WO2020/050554
PCT Pub. Date: Mar. 12, 2020

(65) Prior Publication Data
US 2021/0264905 A1 Aug. 26, 2021

(30) Foreign Application Priority Data
Sep. 6, 2018 (KR) .................. 10-2018-0106303

(51) Int. Cl.
*G10L 15/18* (2013.01)
*G06F 3/0482* (2013.01)
(Continued)

(52) U.S. Cl.
CPC ........ *G10L 15/1815* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS 7,672,845 B2  3/2010  Beranek et al.
8,452,336 B2  5/2013  Lee et al.
(Continued)

FOREIGN PATENT DOCUMENTS

JP     2011-205238 A     10/2011
KR  10-2012-0110833 A    10/2012
(Continued)

OTHER PUBLICATIONS

Korean Office Action dated Aug. 30, 2022, issued in Korean Patent Application No. 10-2018-0106303.
(Continued)

*Primary Examiner* — Haimei Jiang
(74) *Attorney, Agent, or Firm* — Jefferson IP Law, LLP

(57) ABSTRACT

A control method for an electronic device is disclosed. The control method comprises the steps of during a call with a user of another electronic device by means of an electronic device, acquiring at least one keyword from a content of the call with the user of the another electronic device displaying the at least one keyword during the call and providing a search result for a keyword selected by a user from among the displayed at least one keyword. Particularly, at least a part of the control method of the present disclosure may use an artificial intelligence model learned according to at least one of machine learning, a neural network, and a deep learning algorithm.

21 Claims, 21 Drawing Sheets

(51) Int. Cl.
*G06F 3/0488* (2022.01)
*G06F 16/33* (2019.01)
*G06F 16/3332* (2025.01)
*G10L 15/08* (2006.01)
*G10L 15/16* (2006.01)

(52) U.S. Cl.
CPC .......... *G06F 16/3334* (2019.01); *G10L 15/16* (2013.01); *G10L 2015/088* (2013.01)

(56) References Cited

U.S. PATENT DOCUMENTS

| | | | | |
|---|---|---|---|---|
| 8,537,983 | B1* | 9/2013 | Haggerty | G06F 3/167 |
| | | | | 379/265.06 |
| 9,443,518 | B1* | 9/2016 | Gauci | G06F 40/169 |
| 9,495,176 | B2 | 11/2016 | Joung et al. | |
| 9,880,807 | B1* | 1/2018 | Haggerty | G06F 3/167 |
| 9,986,397 | B2 | 5/2018 | Jeong | |
| 10,002,345 | B2* | 6/2018 | Ganani | G06F 16/335 |
| 2008/0319649 | A1* | 12/2008 | Nath | G06Q 30/02 |
| | | | | 701/439 |
| 2010/0114899 | A1* | 5/2010 | Guha | G06F 16/9535 |
| | | | | 707/E17.089 |
| 2010/0175020 | A1 | 7/2010 | Kim et al. | |
| 2011/0076994 | A1 | 3/2011 | Kim et al. | |
| 2011/0267419 | A1* | 11/2011 | Quinn | G06F 3/04842 |
| | | | | 348/E7.083 |
| 2012/0237006 | A1* | 9/2012 | Kim | H04M 1/2757 |
| | | | | 379/88.01 |
| 2014/0019846 | A1* | 1/2014 | Gilead | G06F 21/31 |
| | | | | 715/234 |
| 2014/0058831 | A1* | 2/2014 | Duva | H04M 3/5175 |
| | | | | 705/14.45 |
| 2014/0164923 | A1* | 6/2014 | Georgiev | G06F 3/0485 |
| | | | | 715/716 |
| 2014/0164985 | A1* | 6/2014 | Pimmel | G06F 16/9535 |
| | | | | 715/784 |
| 2016/0104226 | A1* | 4/2016 | Choi | G06Q 30/0601 |
| | | | | 705/26.61 |
| 2016/0330150 | A1* | 11/2016 | Joe | G06F 3/0486 |
| 2017/0017374 | A1* | 1/2017 | Herz | G06F 3/0486 |
| 2017/0324858 | A1 | 11/2017 | Gao et al. | |
| 2017/0344517 | A1* | 11/2017 | Murakawa | G06V 10/273 |
| 2018/0061396 | A1* | 3/2018 | Srinivasan | G10L 15/005 |
| 2018/0181922 | A1* | 6/2018 | Choi | G06Q 10/06311 |
| 2019/0156826 | A1* | 5/2019 | Cromack | G10L 15/22 |
| 2019/0171357 | A1* | 6/2019 | Norris, III | G06F 3/04842 |
| 2019/0332345 | A1* | 10/2019 | Song | G06F 16/683 |
| 2020/0183971 | A1* | 6/2020 | Klein | G06F 16/953 |
| 2021/0406299 | A1* | 12/2021 | Lei | G06F 16/3334 |
| 2022/0406304 | A1* | 12/2022 | Marzorati | G06F 3/167 |

FOREIGN PATENT DOCUMENTS

| | | |
|---|---|---|
| KR | 10-1379405 B1 | 3/2014 |
| KR | 10-2014-0109719 A | 9/2014 |
| KR | 10-1455924 B1 | 11/2014 |
| KR | 10-2015-0128639 A | 11/2015 |
| KR | 10-2015-0134087 A | 12/2015 |
| KR | 10-2016-0043842 A | 4/2016 |
| KR | 10-1630069 B1 | 6/2016 |
| KR | 10-2016-0114928 A | 10/2016 |
| KR | 10-1798968 B1 | 11/2017 |
| WO | 2018/013804 A1 | 1/2018 |

OTHER PUBLICATIONS

Korean Office Action dated Mar. 30, 2023, issued in Korean Patent Application No. 10-2018-0106303.
Korean Office Action with English translation dated Jan. 22, 2024; Korean Appln. No. 10-2023-0168468.
Korean Office Action with English translation dated Nov. 12, 2024; Korean Appln. No. 10-2023-0168468.

* cited by examiner

ELECTRONIC DEVICE AND CONTROL METHOD THEREFOR

TECHNICAL FIELD

This disclosure relates to an electronic device and a control method therefor. More particularly, the disclosure relates to an electronic device which may obtain at least one keyword from a call content to be used for various functions and a control method therefor.

The disclosure relates to an artificial intelligence (AI) system utilizing machine learning algorithm and an application thereof.

BACKGROUND ART

In recent years, AI systems have been used in various fields. An AI system is a system in which a machine learns, judges, and iteratively improves analysis and decision making, unlike an existing rule-based smart system. As the use of AI systems increases, for example, an accuracy, a recognition rate and understanding or anticipation of a user's taste may be correspondingly increased. As such, existing rule-based smart systems are gradually being replaced by deep learning-based AI systems.

AI technology is composed of machine learning, for example deep learning, and elementary technologies that utilize machine learning.

Machine learning is an algorithmic technology that is capable of classifying or learning characteristics of input data. Element technology is a technology that simulates functions, such as recognition and judgment of a human brain, using machine learning algorithms, such as deep learning. Machine learning is composed of technical fields such as linguistic understanding, visual understanding, reasoning, prediction, knowledge representation, motion control, or the like.

Various fields implementing AI technology may include the following. Linguistic understanding is a technology for recognizing, applying, and/or processing human language or characters and includes natural language processing, machine translation, dialogue system, question and answer, speech recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, recommendation, or the like. Knowledge representation is a technology for automating human experience information into knowledge data, including knowledge building (data generation or classification), knowledge management (data utilization), or the like. Motion control is a technique for controlling the autonomous running of the vehicle and the motion of the robot, including motion control (navigation, collision, driving), operation control (behavior control), or the like.

Recently, an electronic device mounted with an artificial intelligence personal assistant platform is provided for efficient management of information and a variety of user experience.

During a call or after a call using an electronic device such as a smartphone, a user may record a call content or perform a web search based on the call content, and this task may include, for example, a task of recording a call content in an application, such as a memo application, a calendar application, a schedule application, or the like, and searching for relevant information in a web browser, or the like. However, these tasks may be cumbersome. In a related-art electronic device, there is no function of performing such tasks, and even an artificial intelligence personal assistant platform has a structure of directly giving a command and thus there is a limitation of passivity.

DISCLOSURE

Technical Problem

The disclosure has been made to solve the above-described problems, and an object of the disclosure is to provide an electronic device capable of obtaining at least one keyword from a call content for utilizing the keyword for various functions and a control method therefor.

Technical Solution

According to an embodiment, a control method of an electronic device includes, during a call with a user of another electronic device by using the electronic device, obtaining at least one keyword from a content of the call with the user of the another electronic device; displaying the at least one keyword during the call; and providing a search result for a keyword selected by a user from among the displayed at least one keyword.

The displaying may include displaying the at least one keyword on a call screen with the user of the another electronic device.

The displaying may include displaying at least one circular user interface (UI) element including each of the at least one keyword.

The method may further include determining a level of importance of the at least one keyword according to a number of mentioning of the keyword during a call with the user of the another electronic device, and the displaying may include displaying a size of the at least one circular UI element differently according to the determined level of importance of the at least one keyword.

The displaying may include, based on the obtained at least one keyword being plural, determining an arrangement interval of the plurality of keywords according to an interval mentioned in a call with the user of the another electronic device and displaying the plurality of keywords according to the determined arrangement interval.

The method may further include, based on the displayed at least one keyword being plural, in response to receiving a user input to sequentially select two or more keywords from among the plurality of keywords, determining the selected two or more keywords as one set, and the providing the search result may include providing a search result about the determined set.

The method may further include displaying a first UI component corresponding to a search function for the determined set and a second UI component corresponding to a memo function for the determined set, and the providing the search result may include, based on the first UI being selected, providing a search result for the determined set.

The method may further include, based on the second UI component being selected, storing the determined set in a memo application.

The obtaining may include obtaining at least one keyword from a content of a call with the user of the another electronic device using a learned artificial intelligence (AI) model.

The method may further include, based on a call with the user of the another electronic device being ended, determining a recommended application among the plurality of applications of the electronic device based on the at least one obtained keyword; and displaying a UI for asking whether to perform a task associated with the determined recommended application and the obtained at least one keyword.

According to an embodiment, an electronic includes a communicator, a display, a memory configured to store computer executable instructions, and a processor, by executing the computer executable instructions, configured to, during a call with a user of another electronic device by using the electronic device, obtain at least one keyword from a content of the call with the user of the another electronic device, control the display to display the at least one keyword during the call, and provide a search result for a keyword selected by a user from among the displayed at least one keyword.

The processor is further configured to control the display to display the at least one keyword on a call screen with the user of the another electronic device.

The processor is further configured to control the display to display at least one circular user interface (UI) element including each of the at least one keyword.

The processor is further configured to determine a level of importance of the at least one keyword according to a number of mentioning of the keyword during a call with the user of the another electronic device and control the display to display a size of the at least one circular UI element differently according to the determined level of importance of the at least one keyword.

The processor is further configured to, based on the obtained at least one keyword being plural, determine an arrangement interval of the plurality of keywords according to an interval mentioned in a call with the user of the another electronic device and display the plurality of keywords according to the determined arrangement interval.

The processor may, based on the displayed at least one keyword being plural, in response to receiving a user input to sequentially select two or more keywords from among the plurality of keywords, determine the selected two or more keywords as one set, and may provide a search result about the determined set.

The processor may control the display to display a first UI component corresponding to a search function for the determined set and a second UI component corresponding to a memo function for the determined set, and, based on the first UI being selected, provide a search result for the determined set.

The processor may, based on the second UI component being selected, store the determined set in a memo application.

The processor may obtain at least one keyword from a content of a call with the user of the another electronic device using a learned artificial intelligence (AI) model.

The processor may, based on a call with the user of the another electronic device being ended, determine a recommended application among the plurality of applications of the electronic device based on the at least one obtained keyword and control the display to display a UI for asking whether to perform a task associated with the determined recommended application and the obtained at least one keyword.

BEST MODE FOR CARRYING OUT THE INVENTION

Figure 1:
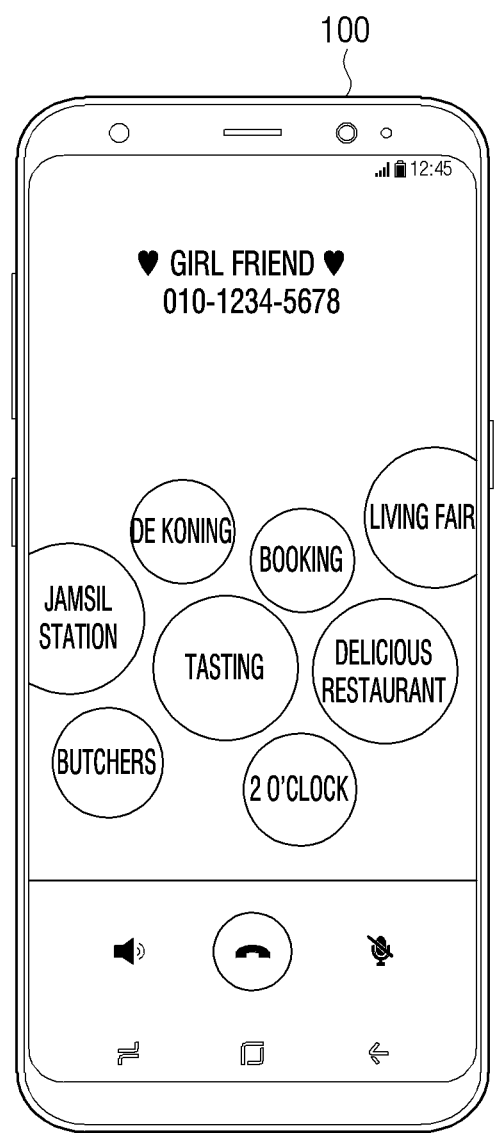
FIG. 1 is a diagram illustrating an electronic device to display keywords obtained from a call according to an embodiment.

Various embodiments will be described with reference to the attached drawings.

Hereinafter, embodiments of the disclosure will be described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., a numerical value, a function, an operation), and do not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, or (3) at least one A and at least one B together.

In addition, expressions "first", "second", or the like, used in the disclosure may indicate various components regardless of a sequence and/or importance of the components, may be used to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

It is to be understood that an element (e.g., a first element) that is "operatively or communicatively coupled with/to" another element (e.g., a second element) may be directly connected to the other element or may be connected via another element (e.g., a third element). Alternatively, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of" The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as having meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

The electronic apparatus may include, for example, smartphones, tablet personal computers (PCs), mobile phones, video telephones, electronic book readers, desktop PCs, laptop PCs, netbook computers, workstations, servers, a personal digital assistance (PDA), a portable multimedia player (PMP), an MP3 player, a medical device, a camera, or a wearable device. The wearable device may include any one or any combination of the accessory type (e.g., as a watch, a ring, a bracelet, a bracelet, a necklace, a pair of glasses, a contact lens or a head-mounted-device (HMD)); a fabric or a garment-embedded type (e.g., an electronic clothing), a skin-attached type (e.g., a skin pad or a tattoo); or a bio-implantable circuit.

In some embodiments, the electronic device may be a home appliance. The home appliance may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™ APPLE TV™, or GOOGLE TV™), a game console (e.g., XBOX™ PLAYSTATION™), an electronic dictionary, an electronic key, a camcorder, or an electronic frame.

In other embodiments, the electronic device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, or an Internet of Things (IoT) device (e.g., light bulbs, sensors, sprinkler devices, fire alarms, thermostats, street lights, toasters, exercise equipment, hot water tanks, heater, boiler, etc.).

According to some embodiments, the electronic device may include a part of furniture or building/structure, an electronic board, an electronic signature receiving device, a projector, any of various measuring devices (e.g., water, electricity, gas, or electromagnetic wave measuring devices, or the like), or the like. In various embodiments, the electronic device may be one or more of the various devices described above. In some embodiments, the electronic device may be a flexible electronic device. The electronic device according to an embodiment is not limited to the devices described above, and may include a new electronic device according to technology development.

One object of the disclosure is to provide an electronic device having an artificial intelligence agent system for providing keyword-based personalized recommendation information by obtaining a keyword from a call content and performing a related command, and a control method thereof.

According to the embodiments of the disclosure, the electronic device may perform, for example, a simple search and a memo function based on a keyword obtained from a call during a call. Immediately after the call, an application predicted to be used by a user based on the keyword obtained from the call may be determined and executed in association with the obtained keyword. The key words obtained in the call may be stored to provide personalization information on the basis of the keywords anytime.

The disclosure will be further described with reference to the drawings.

FIG. 1 is a diagram illustrating an electronic device to obtain and provide a keyword from a call with another party according to an embodiment.

Referring to FIG. 1, a user may perform a call with a user of another electronic device using an electronic device 100. The electronic device 100 may display the keywords obtained in the call on a call screen of the other party during a call. The displayed keywords are selectable user interface (UI) elements. When the user selects a keyword, various functions may be executed based on the selected keyword. For example, a search function may be performed based on the selected keyword, and a memo function may be performed based on the selected keyword.

After the call ends, the electronic device 100 may provide a UI asking the user whether to perform a task to apply (or input) keywords obtained in an application (memo application, calendar application, schedule application, search application, etc.) that is expected to be executed by a user based on the obtained keywords.

The electronic device 100 may store keywords obtained during a call and may provide personalized information based on the keyword obtained from a call anytime, upon request of a user.

Figure 2:
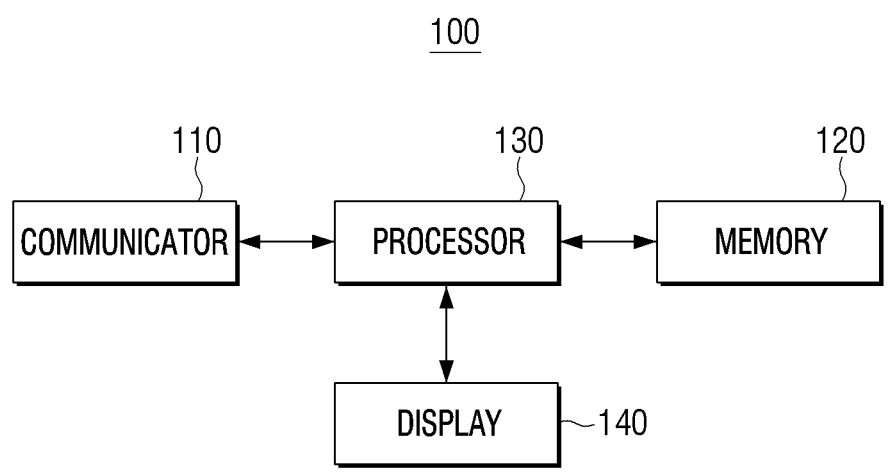
FIGS. 2 and 3 are diagrams illustrating a configuration of an electronic device according to various embodiments.

FIG. 2 is a block diagram illustrating a configuration of the electronic device 100 according to an embodiment.

Referring to FIG. 2, the electronic device 100 includes a communicator 110, a memory 120, a processor 130, and a display 140. Some of the configurations may be omitted depending on the embodiment, and any suitable hardware/software configuration, although not shown, apparent to those of ordinary skill in the art may be further included in the electronic device 100.

The communicator 110 may be connected to network via wireless communication or wired communication to communicate with an external device. Wireless communication may include cellular communication using any one or any combination of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, any one or any combination of Wi-Fi, Bluetooth, Bluetooth low energy (BLE), Zigbee, near field communication (NFC), magnetic secure transmission, radio frequency (RF), or body area network (BAN). Wired communication may include, for example, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, a local area network (LAN) or a wide area network (WAN)), the Internet, or a telephone network.

The communicator 110 may include a cellular module, a Wi-Fi module, a Bluetooth module, global navigation satellite system (GNSS) module (for example: a global positioning system (GPS) module, Glonass module, Beidou module, or Galileo module), a near field communication (NFC) module, radio frequency (RF) module, or the like.

The cellular module may provide at least one of, for example, and without limitation, a voice call, a video call, a text service, an Internet service, or the like, through a communication network. According to an embodiment, the cellular module may perform the discrimination and authentication of an electronic device within the communication network using a subscriber identity module (example: a subscriber identification module (SIM) card). According to an embodiment, the cellular module may perform at least some of the functions that the processor may provide. According to an example embodiment, the cellular module may include, for example, a communication processor (CP).

Each of the Wi-Fi module, the Bluetooth module, the GNSS module, or the NFC module may include various communication circuitry and a processor for processing data to be transmitted and received. According to an example embodiment, at least a portion (example: two or more) of a cellular module, a Wi-Fi module, a Bluetooth module, a GNSS module, an NFC module, or the like, may be included in one integrated chip (IC) or an IC package.

The RF module may, for example, transmit and receive a communication signal (example: an RF signal). The RF module may include, for example, and without limitation, a transceiver, a power amp module (PAM), a frequency filter, a low noise amplifier (LNA), an antenna, or the like. According to an embodiment, at least one of the cellular module, the Wi-Fi module, the Bluetooth module, the GNSS module, the NFC module, etc. may transmit and receive an RF signal through a separate RF module.

The memory 120 may include, for example, an internal memory or an external memory. The internal memory may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD).

The external memory may include a flash drive, for example, a compact flash (CF), secure digital (SD), micro secure digital (micro-SD), mini secure digital (mini-SD), extreme digital (xD), multi-media card (MMC), or a memory stick.

The memory 120 may be accessed by the processor 130, and reading/writing/modifying/updating of data by the processor 130 may be performed associated with the data.

The term memory may include a memory separately provided from the processor 130, and at least one of a read-only memory (ROM, not shown) and a random access memory (RAM, not shown).

The memory 120 may store trained AI model, learning data, or the like.

The memory 120 may store various applications such as a memory application, a schedule application, a calendar application, a web browser application, a call application, or the like.

The display 140 is configured to output an image. The display 140, for example, may be implemented as a liquid crystal display (LCD), light-emitting diode (LED) display, an organic light-emitting diode (OLED) display (e.g., active-matrix organic light-emitting diode (AMOLED), passive-matrix OLED (PMOLED), microelectromechanical systems (MEMS) display, or an electronic paper display. The display 140 may be implemented as a touch screen.

The processor 130 is configured to control overall operations of the electronic device 100. For example, the processor 130 may drive an operating system and an application to control a host of hardware or software elements connected to the processor 130 and may perform various data processing and operations. The processor 130 may be a central processing unit (CPU) or a graphics-processing unit (GPU), or both. The processor 130 may be implemented as at least one of a general processor, a digital signal processor, an application specific integrated circuit (ASIC), a system on chip (SoC), a microcomputer (MICOM), or the like.

The processor 130 may perform various operations using the trained AI model. For example, the processor 130 may obtain at least one keyword in a call with the other party performed using the electronic device 100 using the learned artificial intelligence model. According to an embodiment, the processor 130 may obtain a proper noun by inputting a call content to a named entity recognition (NER) model, and select a keyword among the proper nouns. All the obtained proper nouns may be selected as a keyword, or only those satisfying specific criteria among the obtained proper nouns may be selected as keywords. The specific criteria may be, for example, whether the number of mentioning the proper noun is greater than or equal to the preset number of times, whether an interval of mentioning the proper noun is less than a preset time, or the like. Alternatively, a proper noun belonging to a category corresponding to the keyword may be selected as a keyword. For example, a category such as a time, a person, and a place may be a category corresponding to a keyword. Alternatively, the user may obtain a keyword by inputting a proper noun to the artificial intelligence model learned to select the main keyword.

Various AI model specialized to an application field may be used. The artificial intelligence model is a model trained based on an artificial intelligence algorithm, for example, it may be a model based on a neural network. The learned AI model may include a plurality of weighted network nodes that may be designed to simulate the human brain structure on a computer and simulate a neuron of a human neural network. The plurality of network nodes may each establish a connection relationship so that the neurons simulate the synaptic activity of the neurons sending and receiving signals through the synapse. Also, the learned AI model may include, for example, a neural network model or a deep learning model developed from a neural network model. In the deep learning model, a plurality of network nodes are located at different depths (or layers), and may transmit and receive data according to a convolution connection relationship. Examples of learned determination models include, but are not limited to, Deep Neural Network (DNN), Recurrent Neural Network (RNN), and Bidirectional Recurrent Deep Neural Network (BRDNN).

The electronic device 100 may use an artificial intelligence (AI)-exclusive program (or an artificial intelligence agent) and a personal assistant program (e.g. Bixby™). The personal assistant program is a dedicated program for providing an AI-based service. For AI processing, a conventional general-use processor (for example, CPU) may be used or a single-purpose processor (e.g., GPU, field programmable gate array (FPGA), ASIC, or the like) may be used. The electronic device 100 may include a plurality of processors, for example, a processor dedicated to artificial intelligence and a processor for other processing.

According to one embodiment, when a pre-set user input (e.g., an icon touch corresponding to a personal agent chatbot, a user voice including a preset word, etc.) is input or a button (e.g., a button for executing an AI agent) provided in the electronic device 100 is pressed, the AI agent may be operated (or executed). Alternatively, the AI agent may be in a standby state before a preset user input is detected or a button provided on the electronic device 100 is selected. The standby state is a state of sensing that a pre-defined user voice (e.g., a user voice including a preset keyword (e.g., Bixby) is input) is received to control the start of the operation of the AI agent. When a preset user input is detected while the AI agent is in the standby state or a button provided in the electronic device 100 is selected, the electronic device 100 may operate the AI agent. The AI agent may perform the function of the electronic device 100 based on the voice when the user voice is received, and output an answer when the voice is a voice for asking.

An operation based on AI may be performed in the electronic device 100 and may be performed through an external server. In the latter case, the AI model is stored in a server, and the electronic device 100 may provide data to be input to the AI model to the server, and the server may input the data to the AI model and provide the obtained result data to the electronic device 100.

Figure 3:
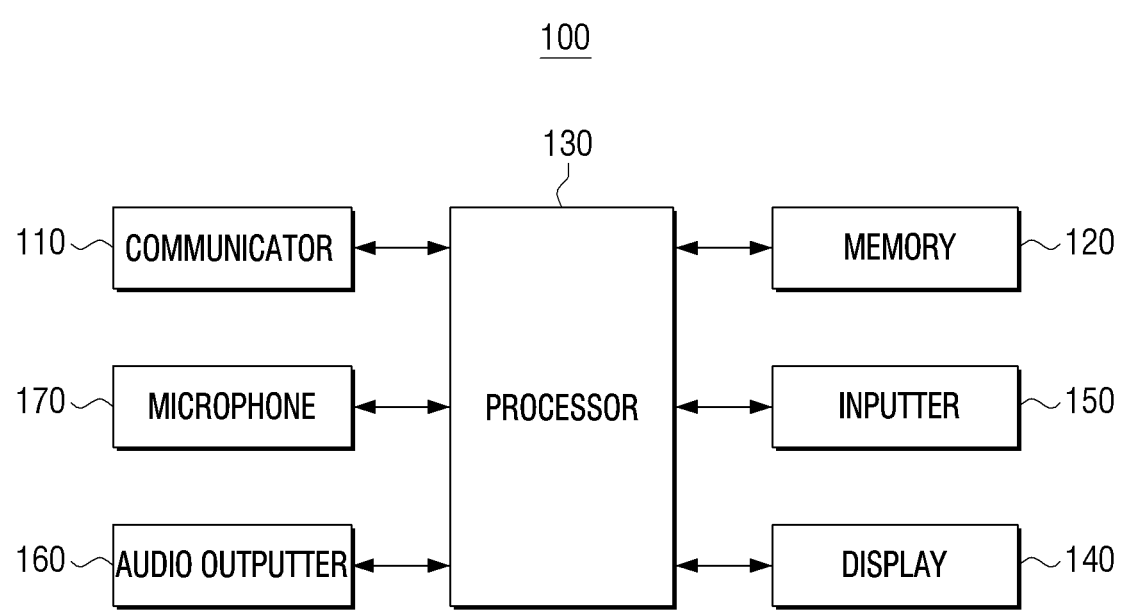

FIG. 3 is a block diagram illustrating a configuration of the electronic device 100 according to another embodiment. As illustrated in FIG. 3, the electronic device 100 may include a communicator 110, a memory 120, a processor 130, a display 140, an inputter 150, an audio outputter 160, and a microphone 170. Some of the configurations may be omitted depending on the embodiment, and any suitable hardware/software configurations apparent to those of ordinary skilled in the art may be further included in the electronic device 100, although not shown. The communicator 110, the memory 120, the processor 130, and the display 140 are described in FIG. 2, and thus the description thereof will be omitted.

The microphone 170 is configured to receive a user voice or other sound and convert the voice or sound into a digital signal. The processor 130 may obtain at least one keyword in a call voice input through the microphone 170. The microphone 170 may be provided inside the electronic device 100, but it is only one embodiment, and may be provided outside the electronic device 100 and electrically connected to the electronic device 100.

The inputter 150 may receive a user input and transfer the user input to the processor 130. The inputter 150 may include a touch sensor, a (digital) pen sensor, a pressure sensor, a key, or a microphone. The touch sensor may use, for example, at least one of an electrostatic type, a pressure sensitive type, an infrared type, and an ultrasonic type. The (digital) pen sensor may, for example, be a part of a touch panel or may include a separate sheet for recognition. The key may include, for example, a physical button, an optical key, or a keypad.

The display 140 and a touch sensor of the inputter 150 may form a mutual layer structure and may be implemented with a touch screen.

The audio outputter 160 may output an audio signal. For example, the audio outputter 110 may output a calling voice of the other party received through the communicator 110. The audio outputter 160 may output audio data stored in the memory 120. For example, the audio outputter 160 may output various notification sounds and may output the voice of an AI assistant. The audio outputter 160 may include a receiver, a speaker, a buzzer, etc.

The memory 120 may store computer executable instructions and the control method of the electronic device 100 described in this disclosure may be performed when it is executed by the processor 130.

For example, the processor 130 may, by executing a computer executable instruction, obtain at least one keyword from a call with a user of another electronic device during a call with a user of another electronic device through the communicator 110, and may control the display 140 so that the obtained keyword is displayed during the call.

The processor 130 may collect the voice which is input through the microphone and the voice of the other party of the another electronic device received through the communicator 110, convert the collected voice into a text, and may obtain a keyword from the converted text.

The processor 130 may obtain at least one keyword from a call with a user of another electronic device using the trained AI model.

According to another embodiment, the processor 130 may obtain at least one keyword from a call with a user of another electronic device based on a rule. For example, the processor 130 may obtain at least one keyword based on the frequency of a word, which is mentioned in a call with a user of another electronic device, the intensity of the sound of a spoken word, etc.

An embodiment of obtaining a keyword from a call will be described with reference to FIGS. 4 and 5.

Figure 4:
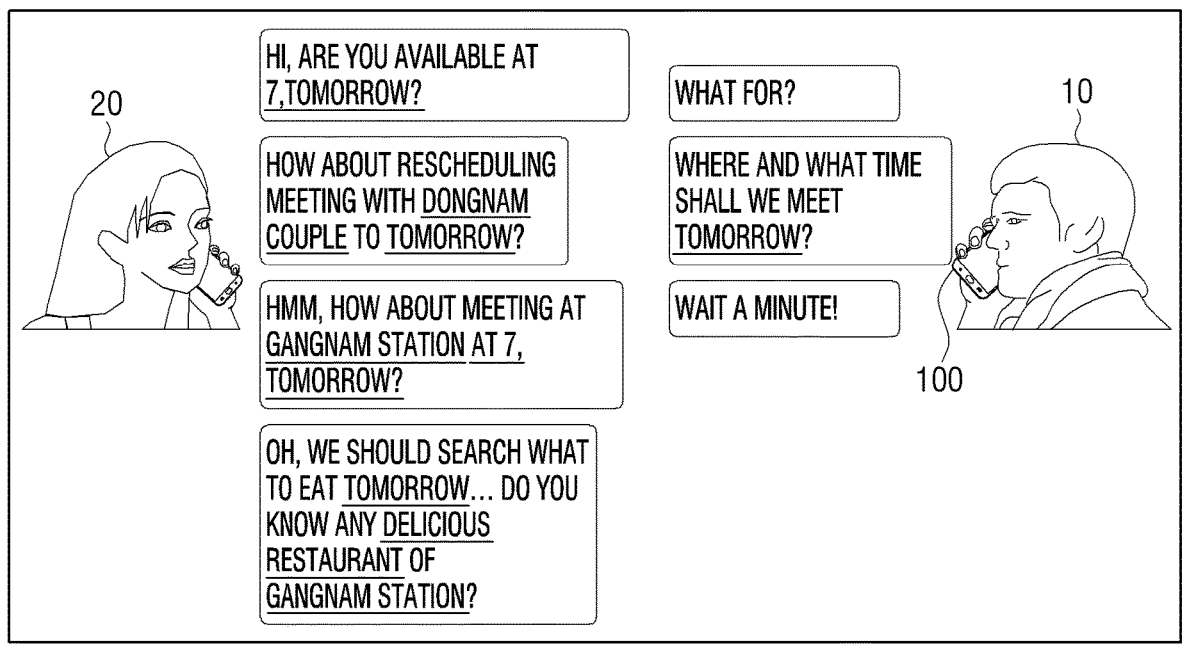
FIGS. 4 and 5 are diagrams illustrating an embodiment of obtaining a keyword from a call content and displaying the obtained keyword on a call screen according to an embodiment.

FIG. 4 illustrates a call content between a user 10 of the electronic device 100 and a user 20 of another electronic device.

The processor 130 may obtain at least one keyword (underlined) from a call content of the call. For example, the processor 130 may obtain nouns such as "tomorrow," "7 pm," "brother Dongnam," "Gangnam Station," "delicious restaurant," or the like, as keywords.

Figure 5:
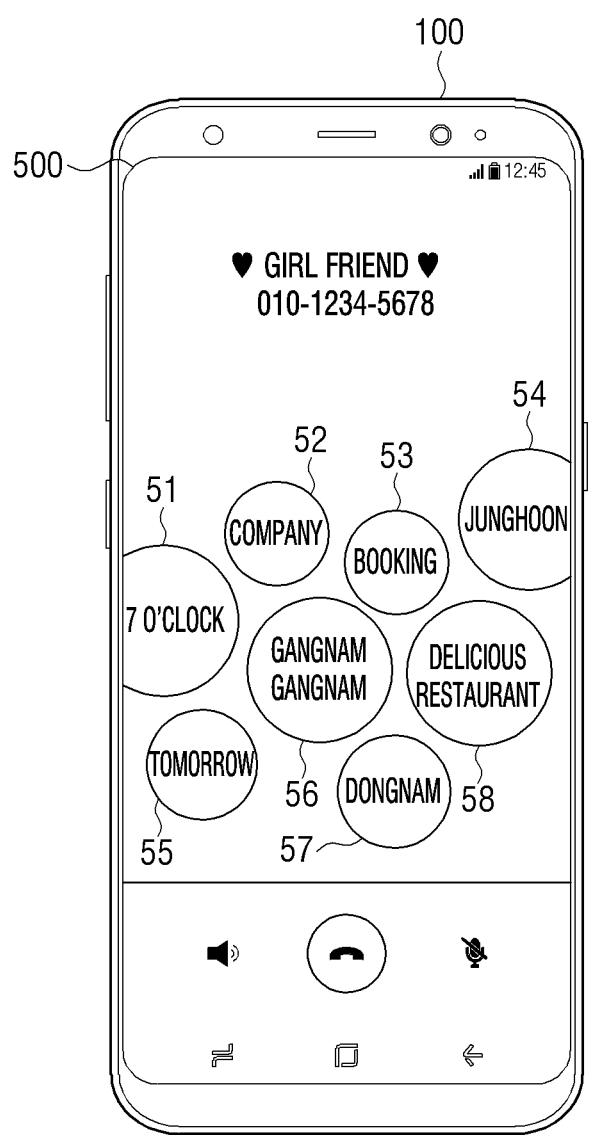

Referring to FIG. 5, the processor 130 may control the display 140 to display at least one obtained keyword. In this case, the processor 130 may control the display 140 to display at least one keyword obtained on a call screen 500 with the user 20 of another electronic device. The call screen 500 is a screen that is displayed on the display 140 during a call with the user 20 of another electronic device and may include information such as a name, contact information, etc. of the user 20 of another electronic device and may include a button user interface (UI) corresponding to a function such as conversation over a speaker, telephone disconnection, a sound mute, or the like.

According to one embodiment, the processor 130 may control the display 140 to display at least one UI element 51 to 58 including at least one keyword obtained from a call. The at least one UI element 51 to 58 may be circular, and more specifically, may be a bubble shape. However, the shape of the UI element including the keyword is not particularly limited. For example, the UI element including the keyword may have a rectangular shape.

The processor 130 may display the size of the at least one UI element 51-58 including a keyword differently according to importance of the keyword included therein. In the case of the UI element including a keyword having a high importance, the size of the UI element may be displayed in a larger size than an UI element including a keyword having a low importance. For example, referring to FIG. 5, UI elements 51, 54, 56, and 58 including keywords having a relatively high importance may be displayed to be larger than UI elements 52, 53, 55, 57 including a keyword having a relatively low importance.

According to an embodiment, the processor 130 may obtain information about an importance of keywords by inputting the keywords to the trained AI model.

According to another embodiment, the processor 130 may determine the level of importance of a keyword according to a weight set differently from each category. For example, if a weight (number in a parenthesis), such as a time category 5, a person category 4, a place category 2, is set, a keyword belonging to a time category has higher importance level than a keyword belonging to a place category.

According to a still another embodiment, the processor 130 may determine a level of importance according to the number of mentioning the keywords from a call. That is, the larger the number of mentioning, the higher the level of importance.

According to one embodiment, the processor 130 may control to display only a predetermined number of keywords on the call screen 500. In this example, the processor 130 may control so as to display only some keywords having a high level of importance.

The keywords displayed in the call screen 500 may disappear from the call screen 500 according to user manipulation. If a specific keyword disappears, another new keyword may be displayed on the call screen 500. For example, a new keyword having a subsequent level of importance may be displayed on the call screen 500.

For example, if there is a user input to remove any one of UI elements 51 to 58 including a keyword, the processor 130 may remove the corresponding UI element from the call screen 500 and may display the UI element including the keyword having the subsequent level of importance on the call screen 500.

The user input to remove the UI element may be, for example, a user's touch motion to move the UI element out of the call screen 500. In another example, the UI element may be a user input to double touch the UI element. Various other user inputs are possible. According to an embodiment, when the UI elements 51-58 are in a bubble shape, a graphic effect of bubble burst may be provided when the UI elements are removed.

The processor 130 may arrange keywords according to the level of association between keywords so that the association between keywords may be more intuitively grasped. According to one embodiment, the processor 130 may determine an arrangement interval of a plurality of keywords according to the interval stated in a call with the user 20 of the other electronic device and may control the display 140 to display a plurality of keywords as the determined arrangement interval.

According to an embodiment, keywords mentioned together may be displayed to be adjacent with each other. For example, if a call includes a sentence "how about meeting at Gangnam Station at 7 o'clock, tomorrow?", a UI element 55 including a keyword "tomorrow", a UI element 51 including "7 o'clock" and a UI element 56 including a keyword "Gangnam Station" may be displayed on positions adjacent to each other.

The user 10 may view the keywords displayed in the call screen 500 during a call, and may be able to intuitively know with which subject a dialogue is proceeded. The keywords obtained in the call may be used in various functions.

According to one embodiment, the processor 130 may apply the keyword selected by the user, among at least one keyword displayed on the display 140, to the application of the electronic device 100, so as to perform a function related to the keyword in the corresponding application.

In one example, the processor 130 may provide a search result for a keyword selected by a user among at least one keyword displayed on the display 140. In another example, the processor 130 may register a keyword selected by the user, among at least one keyword displayed on the display 140, to a memo application. In addition, various functions may be provided.

If a user selects one keyword, it is possible that a function is executed using the one keyword, and if a user selects two or more keywords, it is possible that a function is executed using two or more keywords.

Various methods may be used to select two or more keywords. For example, the two or more keywords may be selected by various user operations, such as by sequentially touching two or more keywords, simultaneously touching two or more keywords (multi touch), and dragging to connect two or more keywords, or the like.

Figure 6:
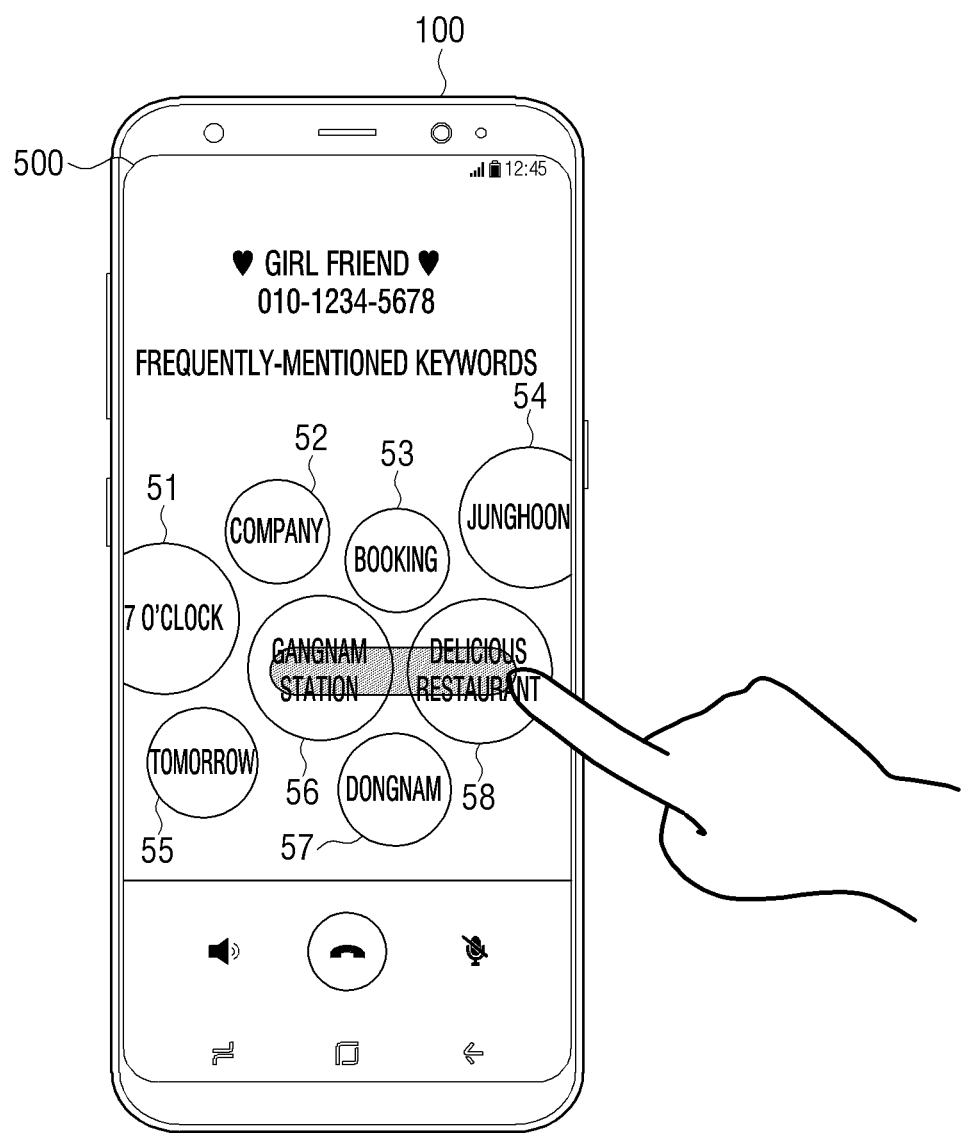
FIG. 6 is a diagram illustrating an embodiment of selecting keywords displayed on a call screen according to an embodiment.

FIG. 6 is a diagram illustrating an embodiment of selecting two or more keywords.

Referring to FIG. 6, a user may select keywords "Gangnam Station" and "delicious restaurant" by performing a dragging manipulation starting from the UI element 56 including "Gangnam Station" and ending at the UI element 58 including the keyword "delicious restaurant."

When a user input to select two or more keywords is received, the processor 130 may determine the selected two or more keywords as one set. Referring to FIG. 6, the processor 130 may determine the keywords "Gangnam Station" and "delicious restaurant" as one set.

The electronic device 100 may perform search or write a memo with the determined set. The description about the embodiment will refer to FIG. 7.

Figure 7:
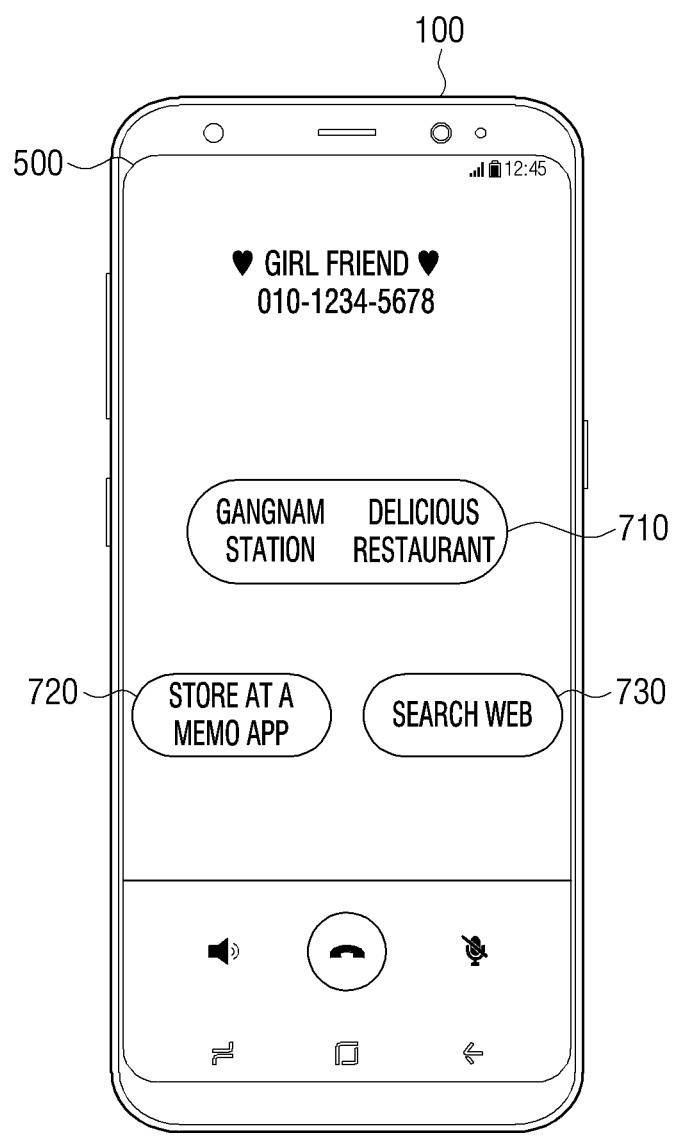
FIG. 7 is a diagram illustrating a user interface (UI) for providing a memo function or a search function with selected keywords according to an embodiment.

FIG. 7 is a diagram illustrating one embodiment of the disclosure for performing a search or writing a memo with a keyword selected by a user among the keywords obtained from the call.

When a user input for selecting two or more keywords is received as illustrated in FIG. 6, the processor 130 may determine two or more keywords as one set and may display the two or more keywords selected by the user in one region 710 of the call screen 500 as in FIG. 7.

The processor 130 may control the display 140 to display a first UI element 720 corresponding to a memo function for the determined set and a second UI element 730 corresponding to a search function for the determined set.

When the first UI element 720 is selected, the processor 130 may store a keyword set in a memo application.

Figure 8:
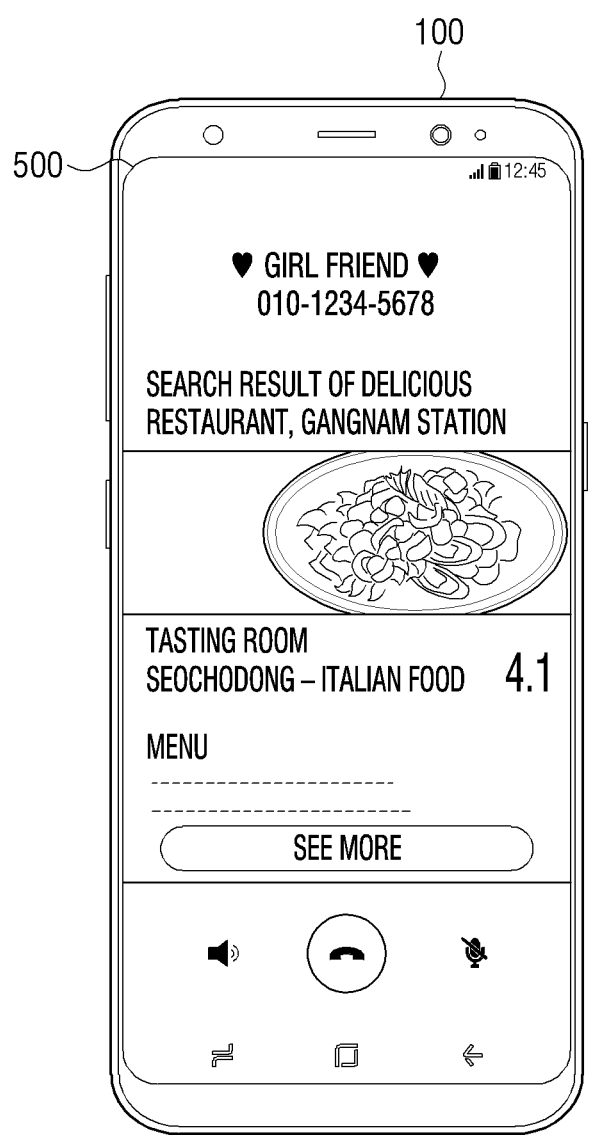
FIG. 8 is a diagram illustrating an embodiment of displaying a screen on a call screen according to searching based on the obtained keywords according to an embodiment.

When the second UI element 730 is selected, the processor 130 may provide a search result for the set of keywords. For example, as shown in FIG. 8, a search result 810 corresponding to "Gangnam Station" and "delicious restaurant" may be provided. The search result 810 may also be provided on the call screen 500.

Figure 9:
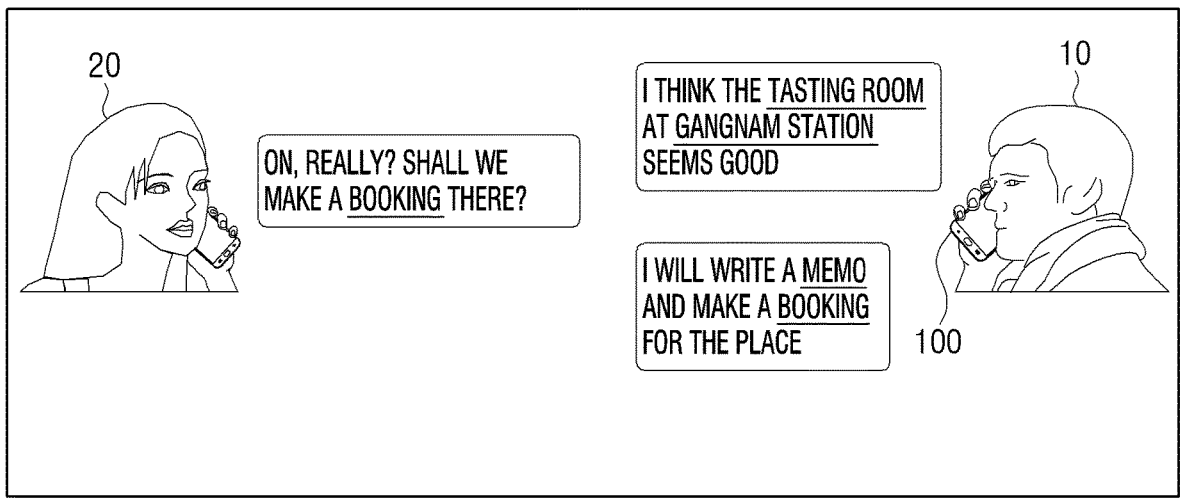
FIGS. 9 and 10 are diagrams illustrating an embodiment of changing a keyword on a real time basis on a call screen according to a call content according to an embodiment.
Figure 10:
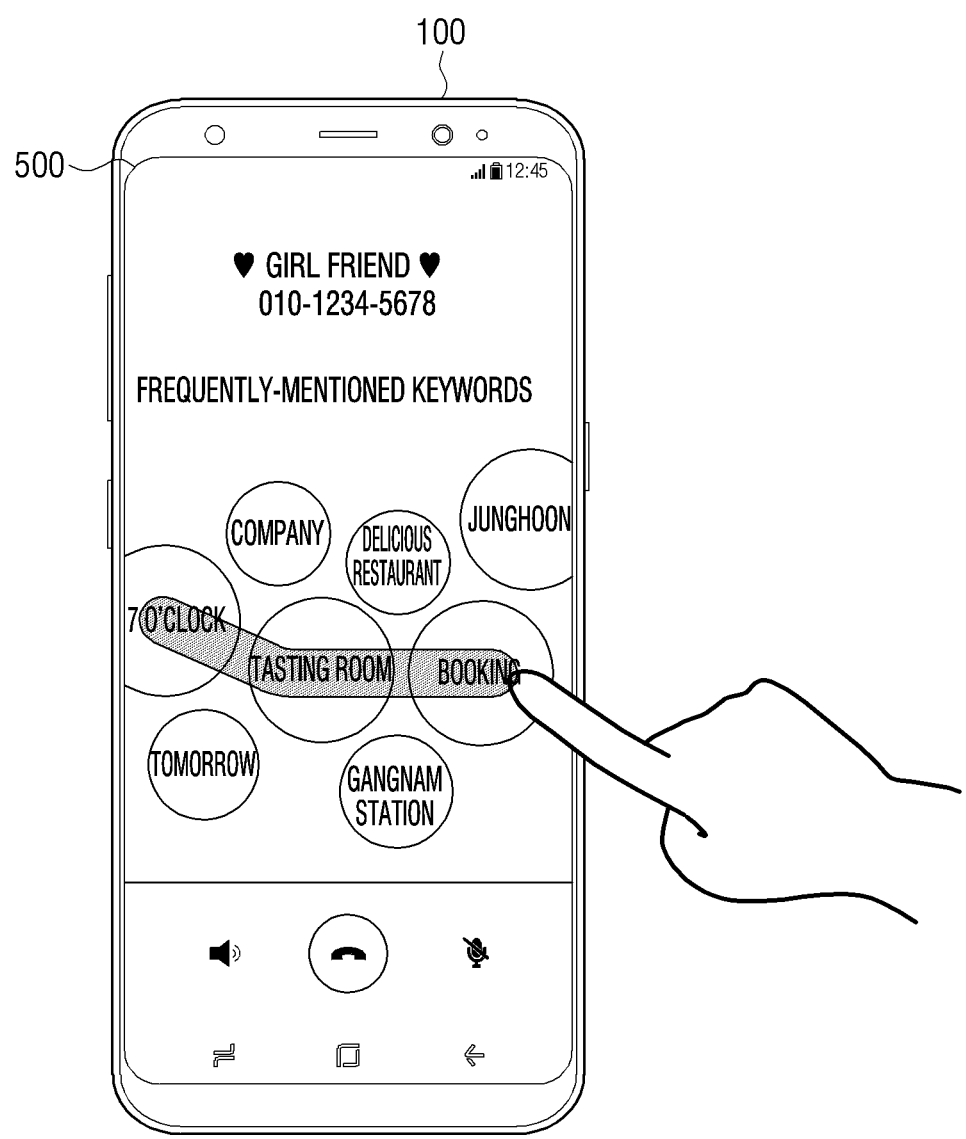

After performing a search and writing a memo, or the like, through the call screen 500, the user 10 may continue calling with the user 20 of the another electronic device as illustrated in FIG. 9. The processor 130 may obtain keywords in real time from a call. Accordingly, the keywords shown in the call screen 500 during a call may be changed in real time. FIG. 10 illustrates the call screen 500 after performing a call as shown in FIG. 9. The keywords displayed in the call screen 500 of FIG. 10 may be identified as being different from the keywords displayed in the call screen 500 of FIG. 5.

Figure 11:
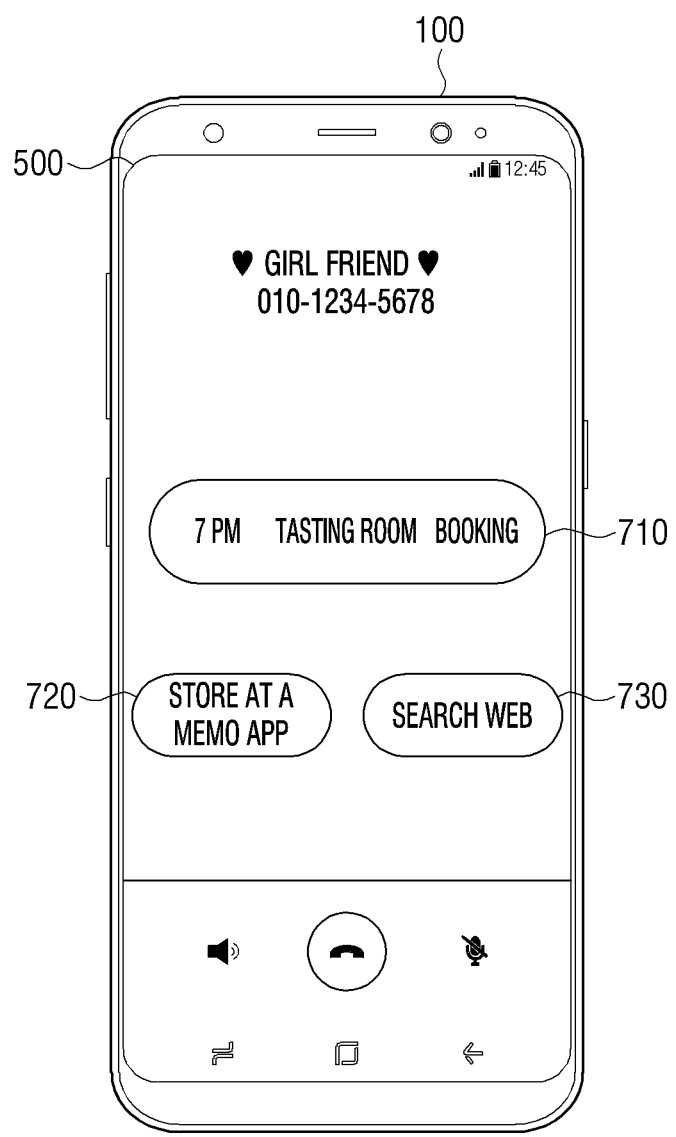
FIG. 11 is a diagram illustrating a user interface (UI) for providing a memory function or a search function with the selected keywords according to another embodiment.

As illustrated in FIG. 10, when a user performs a dragging operation to select a plurality of keywords, the processor 130 may determine three keywords selected by the dragging operation to one set and display the three keywords selected by the user as illustrated in FIG. 11 on one region 710 of the call screen 500.

In the region 710, keywords may be arranged in a natural format according to language structure. The processor 130 may arrange a keyword according to a category (time, place, activity). For example, the processor 130 may place a keyword (tasting room) belonging to a place category to behind the keyword belonging to the time category (7 o'clock), and may place a keyword (booking) belonging to an activity category to behind the keyword belonging to a place category.

The processor 130 may control the display 140 to display a first UI element 720 corresponding to a search function for a set of three keywords and a second UI element 730 corresponding to a memo function for a set of three keywords.

Figure 12:
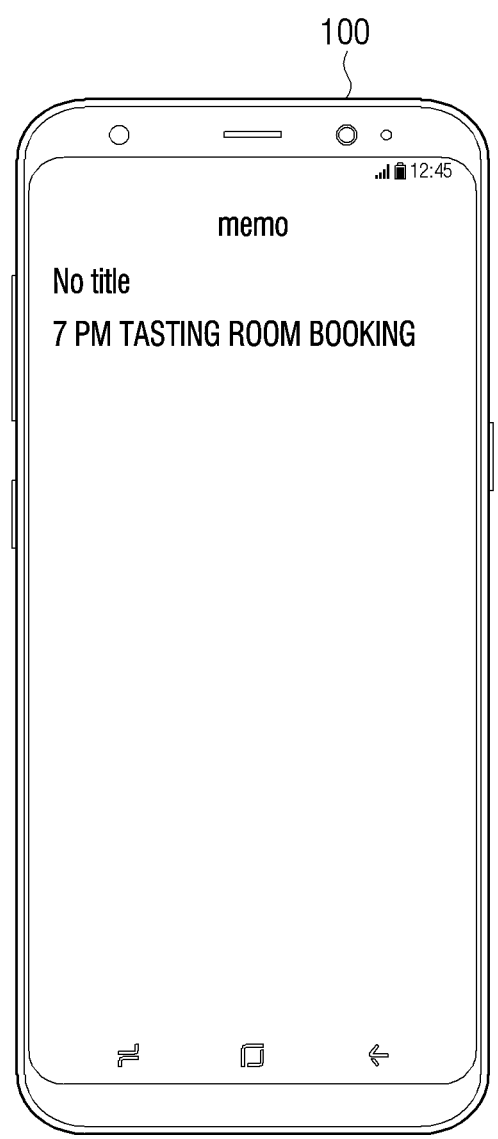
FIG. 12 is a diagram illustrating an embodiment of registering a memory with the keywords obtained from a call.

When the first UI element 720 is selected, the processor 130 may store a keyword set in the memo application. For example, as shown in FIG. 12, the processor 130 may input and store a keyword set "booking of a Tasting Room at 7 o'clock" in a list of keywords in the memo application.

The processor 130, when the call with the user of another electronic device ends, may determine a recommended application among the plurality of applications of the electronic device 100 based on at least one keyword obtained in the call, and may control the display 140 to display a UI for asking whether to perform a task related to the determined recommended application and the obtained at least one keyword. When the UI for asking the task is selected, the processor 130 may perform the task.

The processor 130 may determine an application corresponding to a keyword (or a category of the obtained keyword) obtained in the call to a recommended application based on a mapping list between the keyword (or the category of the keyword) and the application. The mapping list may be stored in the memory 120.

For example, if the recommended application determined based on the keyword is a schedule application, the processor 130 may display a UI asking whether to perform a task of registering a keyword related to a schedule of the obtained at least one keyword in a schedule application. The embodiment will be described with reference to FIG. 13.

Figure 13:
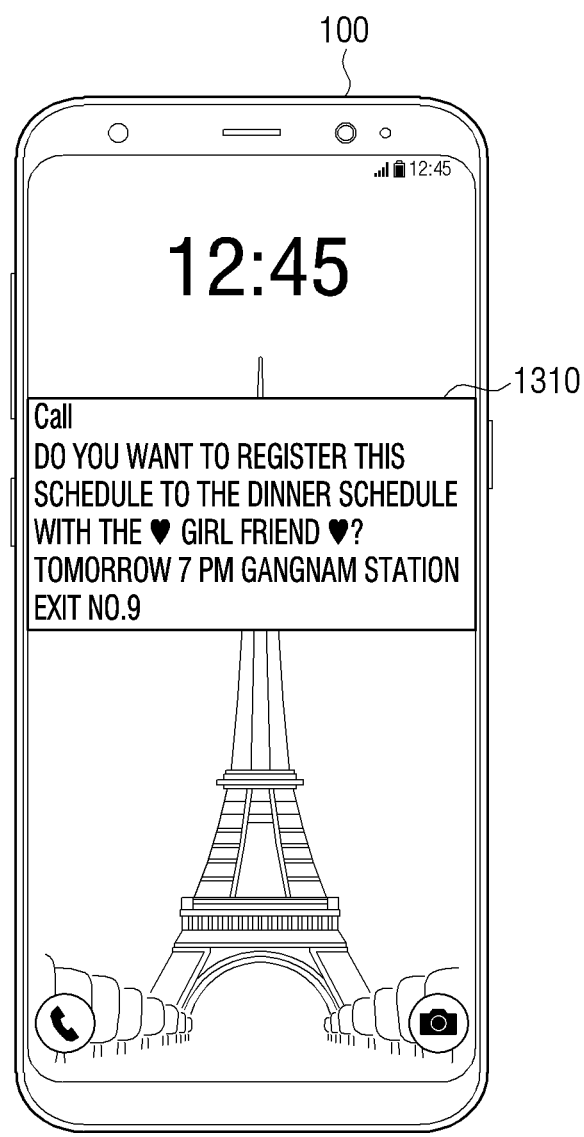
FIG. 13 is a diagram illustrating a UI for recommending a task with the keywords obtained from a call immediately after a call according to an embodiment.

Referring to FIG. 13, when a call with the user 20 of another electronic device is completed, the processor 130 may control the display 140 to display a UI 1310 for asking whether to perform a task of registering the keyword obtained in the call to the schedule application immediately after the call is completed. When the UI 1310 is selected, the processor 130 may perform a task of registering a schedule in the schedule application.

In another example, the processor 130 may control the display 140 to display the UI (e.g., "Do you want to remit 15000 Won to Kim, Young-hee?") to ask whether to perform a task of remitting the invoice amount through the remittance application based on a keyword associated with the invoice amount among at least one obtained keyword, when the recommended application determined based on the at least one keyword obtained in the call is a remittance application.

In another example, the processor 130 may, when a recommended application determined based on at least one keyword obtained in a call is a contact list application, control the display 140 to display a UI (e.g., "Do you want to transmit a contact number of Kim, Cheol-soo to Kim, Yeong-hee?") for asking whether to perform a task to transmit information about a first contact number stored in the contact list application to a second contact stored in the contact list application, based on a keyword associated with transmission of a contact list among at least one keyword.

In another example, the processor 130 may control the display 140 to display a UI for asking whether to perform a task of transmitting a character composed of keywords based on a keyword related to a message transmission among at least one keyword when the recommended application determined based on the at least one keyword obtained in the call is a message application.

According to still another embodiment, personalization information may be provided based on at least one keyword obtained during a call. An example of personalized information will be described with reference to FIG. 14.

Figure 14:
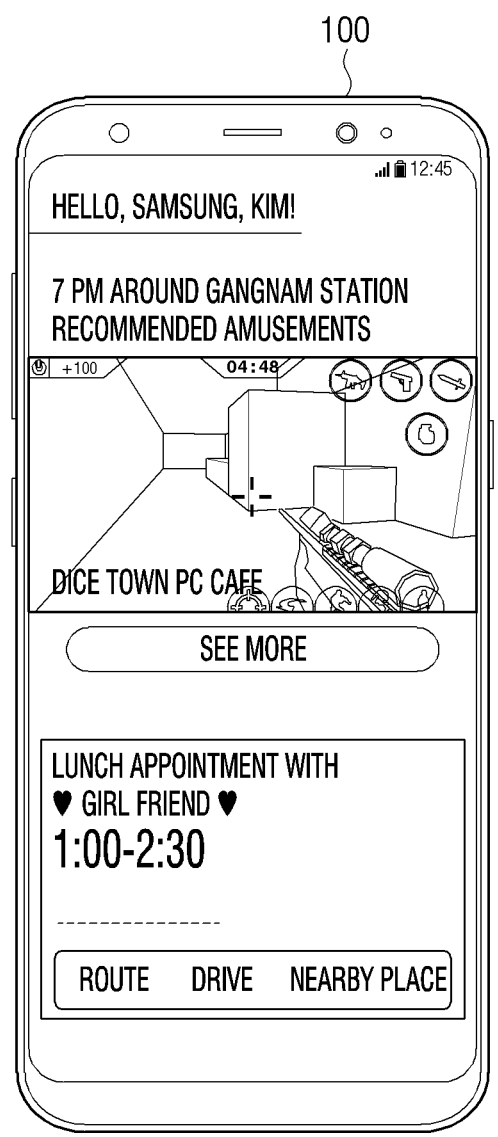
FIG. 14 is a diagram illustrating an embodiment of providing personalization information with the keywords obtained from a call according to an embodiment.

FIG. 14 is a diagram illustrating a personalization information provision screen according to an embodiment.

The electronic device 100 may provide personalization information based on user profile information. The user profile information may include, for example, a user name, age, gender, occupation, schedule, a route of movement of a user (a route through which the electronic device 100 moves), and at least one keyword obtained in a call.

The electronic device 100 may provide information based on the user profile information. The electronic device 100 may provide information based on a keyword obtained in a call. For example, when a keyword of "dinner", "7 o'clock", and "Gangnam Station" are obtained in a call with a user of another electronic device as shown in FIG. 14, information about a "recommended amusements around Gangnam Station at 7 pm" may be provided based on the keywords. According to an embodiment, information which further suits a context of use based on the call content may be provided.

Figure 15:
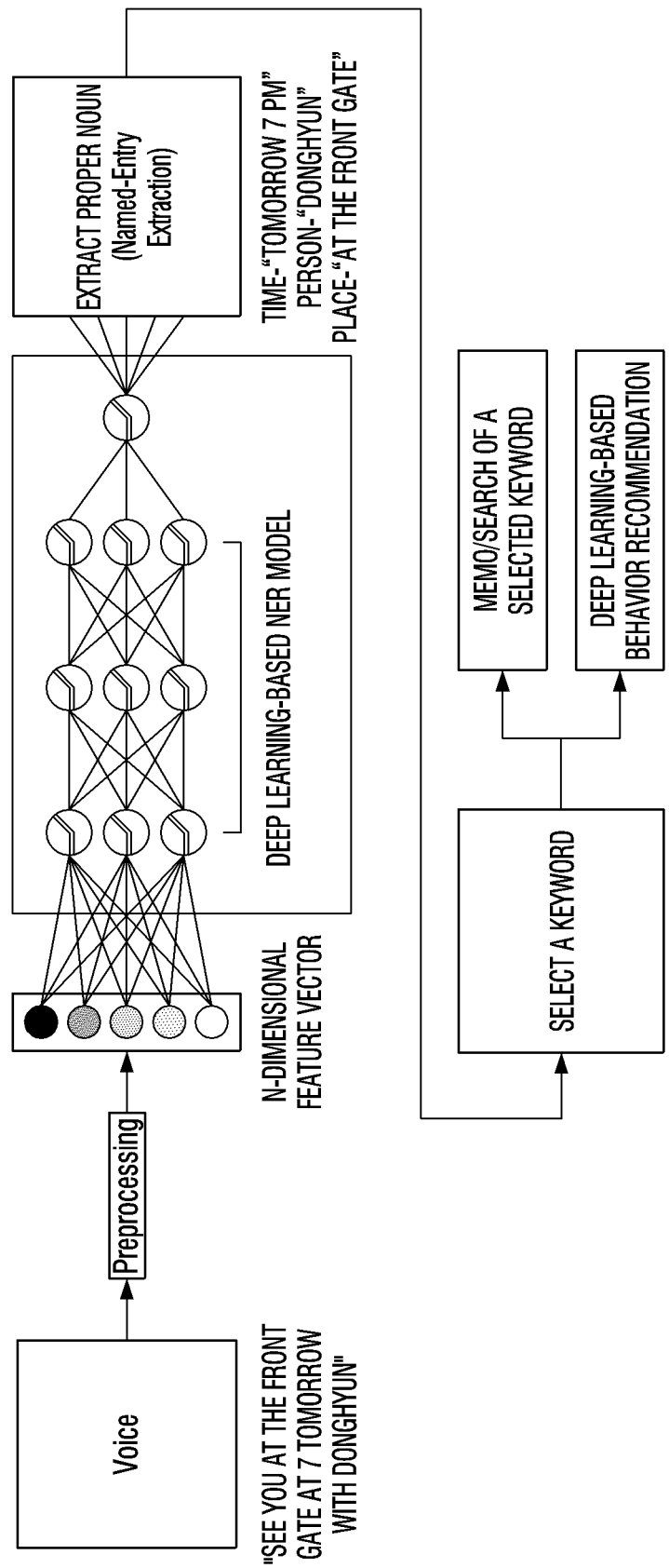
FIG. 15 is a diagram illustrating an overall structure of a service providing various functions by obtaining a keyword from a call according to an embodiment.

FIG. 15 is a diagram illustrating an overall structure of a service providing various functions by obtaining a keyword from a call according to an embodiment.

Referring to FIG. 15, when a user performs a call with a user of another electronic device through the electronic device 100, a call voice (voice of a user and other electronic device) is input to perform pre-processing for incoming call voice and feature vectors may be obtained. By inputting feature vectors to a trained artificial intelligence model, for example, a named entity recognition (NER) model, the proper noun may be extracted from the call voice.

The electronic device 100 may select a keyword among the extracted proper nouns. At this time, the importance of the keyword may be considered. The electronic device 100 may provide the selected keywords to the user, perform a search with the keywords selected by the user, or perform a memo function. The electronic device 100 may also use the selected keywords to make a deep learning-based behavior recommendation (e.g., schedule registration, transmission, contact transmission, short message service (SMS) transmission, or the like).

The functions performed in the embodiments described above may be performed using an artificial intelligence model. For example, obtaining a keyword from a call content, determination of importance for the keyword, the arrangement of a keyword, determination of a recommended application based on the keyword, or the like, may be performed using the artificial intelligence model.

Figure 16:
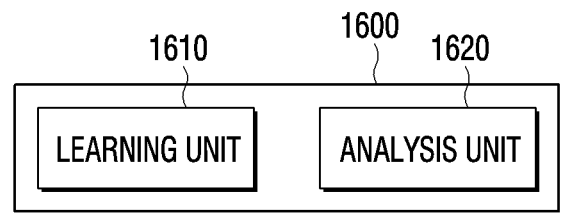
FIG. 16 is a block diagram illustrating a processor for learning and using a recognition model according to an embodiment.

FIG. 16 is a block diagram illustrating a processor for learning and using a recognition model according to an embodiment.

Referring to FIG. 16, a processor 1600 may include at least one of a learning unit 1610 and an analysis unit 1620.

The learning unit 1610 may generate an artificial intelligence model having an identification criterion using learning data.

For example, the learning unit 1610 may generate and train an artificial intelligence model to obtain a keyword from voice data with the voice data as learning data.

The analysis unit 1620 may input voice data to the artificial intelligence model to obtain a keyword from the voice data. The artificial intelligence model may include a speech to text (STT) module, a named entity recognition (NER) module, and a keyword selection module, or the like, by functions.

The STT module converts the input speech to text. The NER module receiving the converted text may extract a proper noun from a text. The keyword selection module may identify the importance of the extracted proper noun, and may select a keyword. The importance may be determined according to a weight of a proper noun, a weight of a category to which the proper noun belongs, a frequency of use of a proper noun, an usage interval of a proper noun, a volume of a speech of a user uttering the proper noun, or the like.

At least a portion of the learning unit 1610 and at least a portion of the analysis unit 1620 may be implemented as software modules or at least one hardware chip form and mounted in the electronic device 100. For example, either one or both of the learning unit 1610 and the analysis unit 1620 may be manufactured in the form of an exclusive-use hardware chip for artificial intelligence (AI), or a conventional general purpose processor (e.g., a CPU or an application processor) or a graphics-only processor (e.g., a GPU) and may be mounted on the electronic device 100 described above or a server providing an analysis result to the electronic device 100.

Herein, the exclusive-use hardware chip for artificial intelligence is a dedicated processor for probability calculation, and it has higher parallel processing performance than existing general purpose processor, so it can quickly process computation tasks in artificial intelligence such as machine learning. When the learning unit 1610 and the analysis unit 1620 are implemented as a software module (or a program module including an instruction), the software module may be stored in a computer-readable non-transitory computer readable media. In this case, the software module may be provided by an operating system (OS) or by a predetermined application. Alternatively, some of the software modules may be provided by an O/S, and some of the software modules may be provided by a predetermined application.

The learning unit 1610 and the analysis unit 1620 may be mounted on one server, or may be mounted on separate servers, respectively. For example, the processor 1600 of FIG. 16 may be the processor 130 of FIG. 2 or FIG. 3. For another example, one of the learning unit 1610 and the analysis unit 1620 may be included in the electronic device 100, and the other one may be included in an external server. In addition, the learning unit 1610 and the analysis unit 1620 may provide the model information constructed by the learning unit 1610 to the analysis unit 1620 via wired or wireless communication, and provide data that is input to the analysis unit 1620 to the learning unit 1610 as additional learning data.

Figure 17:
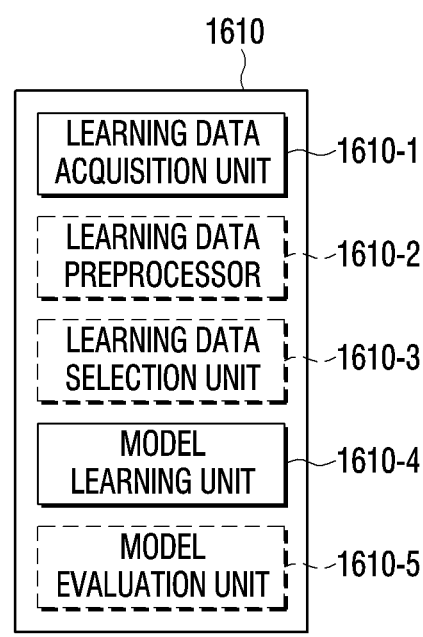
FIGS. 17 to 19 are block diagrams illustrating a learning unit and an analysis unit according to various embodiments.

FIG. 17 is a block diagram illustrating the learning unit 1610 according to an embodiment.

Referring to FIG. 17, the learning unit 1610 according to some embodiments may implement a learning data acquisition unit 1610-1 and a model learning unit 1610-4. The learning unit 1610 may further selectively implement at least one of a learning data preprocessor 1610-2, a learning data selection unit 1610-3, and a model evaluation unit 1610-5.

The learning data acquisition unit 1610-1 may obtain learning data to train a model for acquiring a keyword from voice data.

The learning data may be data collected or tested by the learning unit 1610 or the manufacturer of the learning unit 1610. For example, learning data may include voice or text.

The model learning unit 1610-4 can use the learning data so that the model has a criterion for understanding, knowing, recognizing, identifying, inferring input data. The model learning unit 1610-4 may train a model through supervised learning using at least a part of learning data as a criterion for identification. Alternatively, the model learning unit 1610-4 may learn, for example, by itself using learning data without specific guidance to make the artificial intelligence model learn through unsupervised learning which detects a criterion for identifying a situation. Also, the model learning unit 1610-4 can learn the artificial intelligence model through reinforcement learning using, for example, feedback on whether the result of providing the response according to learning is correct. The model learning unit 1610-4 can also make an artificial intelligence model learn using, for example, a learning algorithm including an error back-propagation method or a gradient descent.

The model learning unit 1610-4 can determine a model having a great relevance between the input learning data and the basic learning data as a recognition model to be learned when there are a plurality of models previously constructed. In this case, the basic learning data may be pre-classified according to the type of data, and the model may be pre-constructed for each type of data. For example, basic learning data may be pre-classified based on various criteria such as a region in which learning data is generated, time when learning data is generated, size of learning data, a genre of learning data, a generator of learning data, or the like.

When the model is learned, the model learning unit 1610-4 can store the learned model. In this case, the model learning unit 1610-4 can store the learned model in the memory 120 of the electronic device 100. Alternatively, the model learning unit 1610-4 may store the learned model in a memory of a server connected to the electronic device 100 via a wired or wireless network.

The learning unit 1610 may further implement a learning data preprocessor 1610-2 and a learning data selection unit 1610-3 to improve the processing capability of the model or to save resources or time required for generation of the model.

The learning data preprocessor 1610-2 can preprocess acquired data so that the data obtained in the learning for identifying a situation may be used. That is, the learning data preprocessor 1610-2 can process the acquired data into a predetermined format so that the model learning unit 1610-4 may use the acquired data for learning to identify a situation.

The learning data selection unit 1610-3 can select data required for learning from the data acquired by the learning data acquisition unit 1610-1 or the data preprocessed by the learning data preprocessor 1610-2. The selected learning data may be provided to the model learning unit 1610-4. The learning data selection unit 1610-3 can select learning data necessary for learning from the acquired or preprocessed data in accordance with a predetermined selection criterion. The learning data selection unit 1610-3 may also select learning data according to a predetermined selection criterion by learning by the model learning unit 1610-4.

The learning unit 1610 may further implement the model evaluation unit 1610-5 to improve a processing capability of the model.

The model evaluation unit 1610-5 may input evaluation data to the model, and if the analysis result which is output from the evaluation result does not satisfy a predetermined criterion, the model evaluation unit 1610-5 may make the model learning unit 1610-4 learn again. In this case, the evaluation data may be predefined data to evaluate the model.

For example, when the number or ratio of evaluation data for which analysis result is not correct exceeds a preset threshold, among the analysis results of the model trained for the evaluation data, the model evaluation unit 1610-5 may evaluate that the data does not satisfy a predetermined criterion.

When there are a plurality of learned models, the model evaluation unit 1610-5 may evaluate whether each learned model satisfies a predetermined criterion, and determine the model which satisfies a predetermined criterion as a final model. Here, when there are a plurality of models that satisfy a predetermined criterion, the model evaluation unit 1610-5 may determine one or a predetermined number of models which are set in an order of higher evaluation score as a final model.

Figure 18:
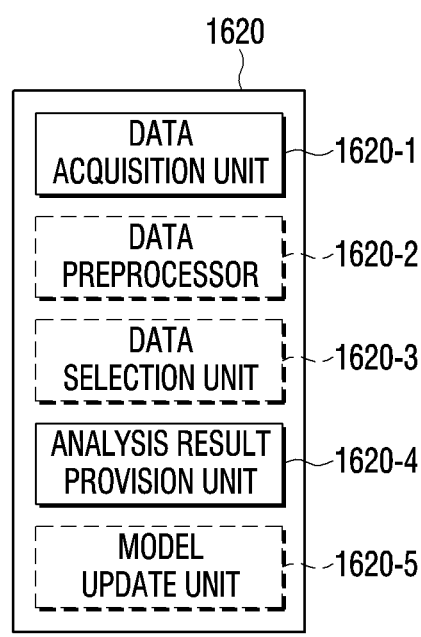

Referring to FIG. 18, the analysis unit 1620 according to some embodiments may include a data acquisition unit 1620-1 and an analysis result provision unit 1620-4. In addition, the analysis unit 1620 may further implement at least one of a data preprocessor 1620-2, a data selection unit 1620-3, and a model update unit 1620-5 in a selective manner.

The data acquisition unit 1620-1 may obtain data necessary for identifying a situation. The analysis result provision unit 1620-4 may apply the acquired data obtained from the data acquisition unit 1620-1 to the learned model as an input value. The analysis result provision unit 1620-4 applies the data selected by the data preprocessor 1620-2 or the data selection unit 1620-3 to be described later to the model to obtain the analysis result. The analysis result may be determined by the model.

In an embodiment, the analysis result provision unit 1620-4 may obtain at least one keyword by applying voice data obtained from the data acquisition unit 1620-1 to the AI model.

The analysis unit 1620 may further include the data preprocessor 1620-2 and the data selection unit 1620-3 in order to improve an analysis result of the model or save resources or time to provide the analysis result.

The data preprocessor 1620-2 may preprocess the acquired data so that the acquired data may be used to identify a situation. That is, the data preprocessor 1620-2 can process the obtained data into the pre-defined format so that the analysis result provision unit 1620-4 may use the acquired data.

The data selection unit 1620-3 can select data required for identifying a situation from the data acquired by the data acquisition unit 1620-1 or the data preprocessed by the data preprocessor 1620-2. The selected data may be provided to the analysis result provision unit 1620-4. The data selection unit 1620-3 can select some or all of the obtained or preprocessed data according to a predetermined selection criterion for identifying a situation. The data selection unit 1620-3 can also select data according to a predetermined selection criterion by learning by the model learning unit 1610-4.

The model update unit 1620-5 can control the updating of the model based on the evaluation of the analysis result provided by the analysis result provision unit 1620-4. For example, the model update unit 1620-5 may provide the analysis result provided by the analysis result provision unit 1620-4 to the model learning unit 1610-4 so that the model learning unit 1610-4 can ask for further learning or updating the model.

Figure 19:
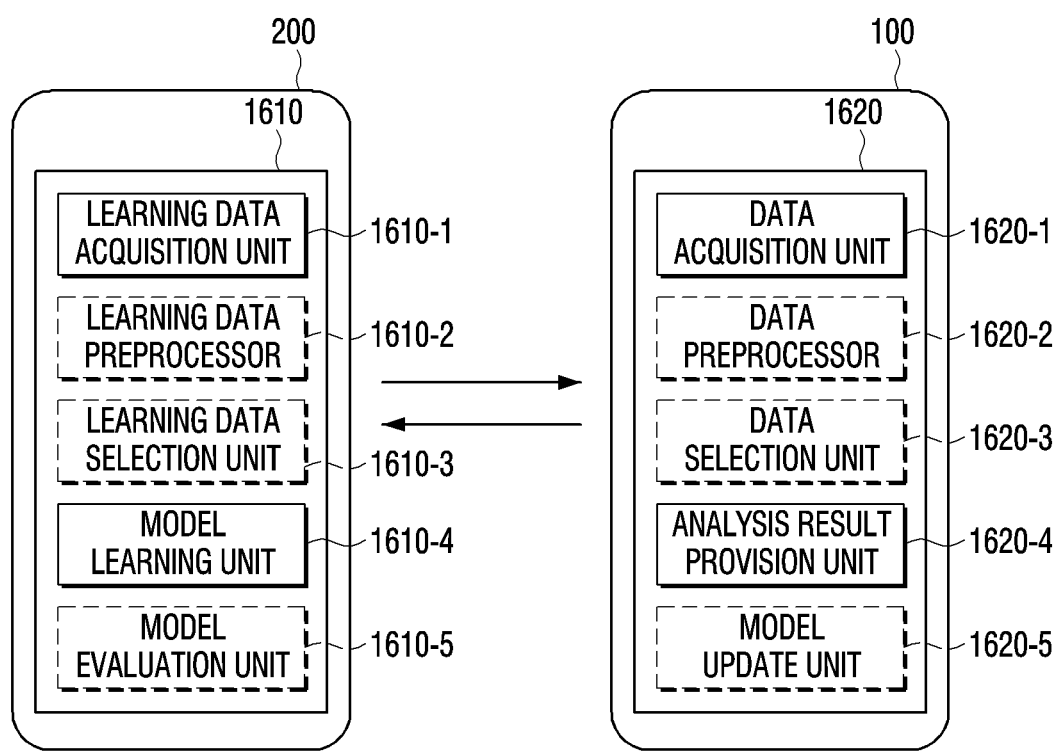

FIG. 19 is a diagram illustrating an embodiment in which the learning unit 1610 and the analysis unit 1620 are implemented in different devices.

Referring to FIG. 19, the external server 200 may include the learning unit 1610 and the electronic device 100 may include the analysis unit 1620. The electronic device 100 and the server 200 may communicate with each other on a network.

The analysis result provision unit 1620-4 of the electronic device 100 applies the data selected by the data selection unit 1620-3 to the model generated by the server 200 to obtain the analysis result. In this case, the analysis result provision unit 1620-4 of the electronic device 100 may receive a model generated by the server 200 from the server 200, and may use the received model to obtain at least one keyword in a call with the user of the electronic device 100.

Figure 20:
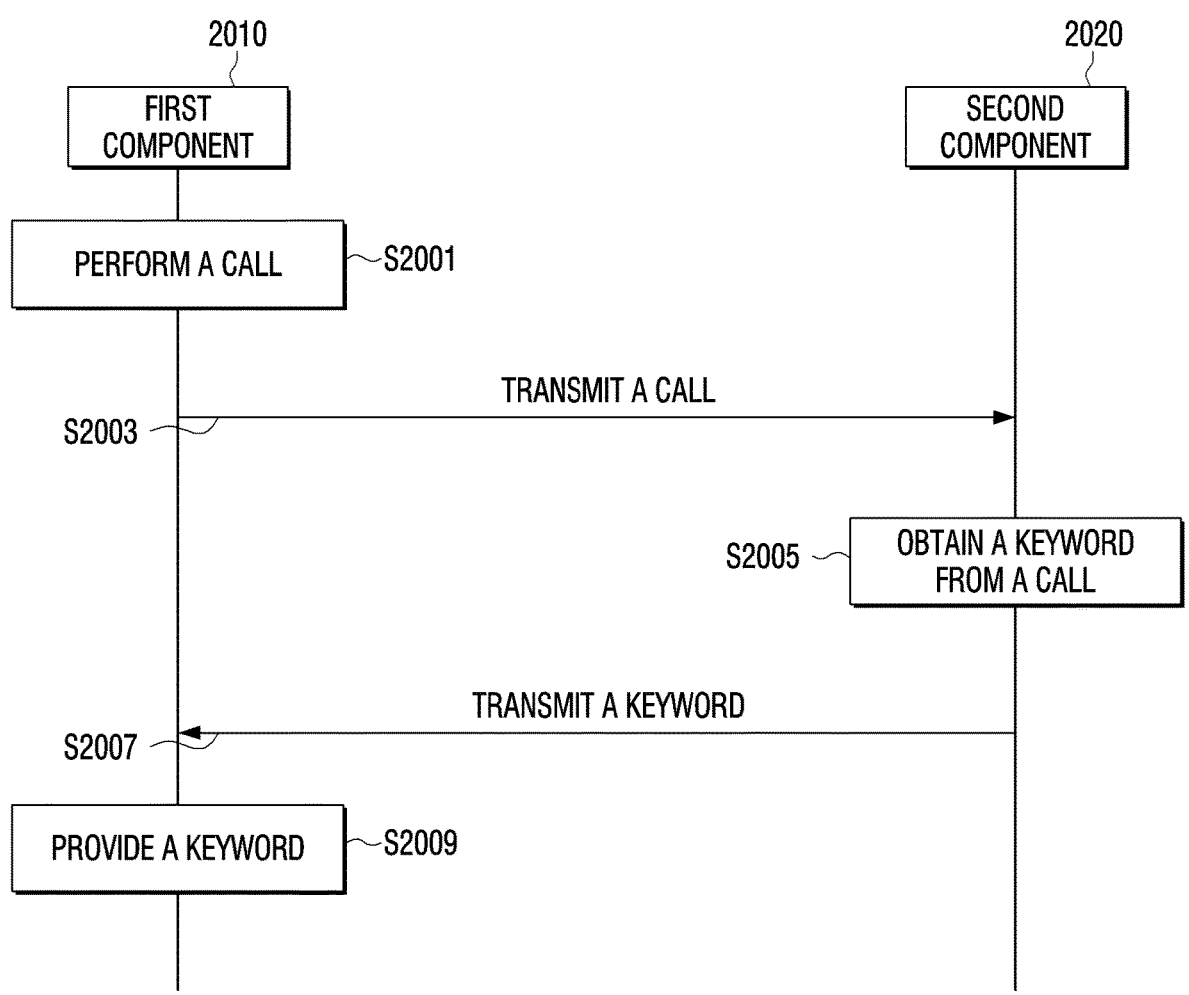
FIG. 20 is a flowchart of a network system using an AI model according to an embodiment.

FIG. 20 is a flowchart of a network system using an AI model according to various embodiments.

In FIG. 20, the network system using the AI model may include a first component 2010 and a second component 2020.

Here, the first component 2010 may be the electronic device 100 and the second component 2020 may be a server storing the AI model. Alternatively, the first component 2010 may be a general purpose processor and the second component 2020 may be an AI dedicated processor. Alternatively, the first component 2010 may be at least one application, and the second component 2020 may be an operating system (OS). That is, the second component 2020 may be more integrated than the first component 2010, may be dedicated, delay less, have an outstanding performance, or have many resources. The second component 2020 may be a component that can process many operations required for generating, updating, or applying the model faster and more efficiently than the first component 2010.

An interface for transmitting/receiving data between the first component 2010 and the second component 2020 may be defined.

For example, an application program interface (API) having learning data (or an intermediate value or a transfer value) to be applied to the model as a factor value may be defined. The API may be defined as a group of subroutines or functions that may be called for any processing of any protocol (for example, a protocol defined in the electronic device 100) to another protocol (e.g., a protocol defined in an external server of the electronic device 100). That is, an environment may be provided in which an operation of another protocol may be performed through any one protocol through the API.

Referring to FIG. 20, the user of the first component 2010 may perform a call with a user of another device in operation S2001.

The first component 2010 may transmit the call content between the user and the other party to the second component 2020 in operation S2003. In this case, audio data including the call voice may be transmitted to the second component 2020, or the text converted to the second component 2020 may be transmitted by converting the speech into text from the first component 2010.

The second component 2020 may obtain at least one keyword in a call using the learned artificial intelligence model in operation S2005. The keyword may be a proper noun having a high importance among the proper nouns included in the call. The importance may be determined based on the frequency of the proper noun, the weight set for the category to which the proper noun belongs, or the like.

The second component 2020 may transmit at least one keyword obtained from the call to the first component 2010 in operation S2007.

The first component 2010 may provide received at least one keyword in operation S2009.

The first component 2010 may provide the received keyword on the call screen and perform various functions using the keyword in response to the user selecting the keyword. As described above, a search function may be provided or a memo generation function may be provided.

The first component 2010 may determine a recommended application based on a keyword received from the second component 2020 and may execute a recommended application by associating with a keyword.

Figure 21:
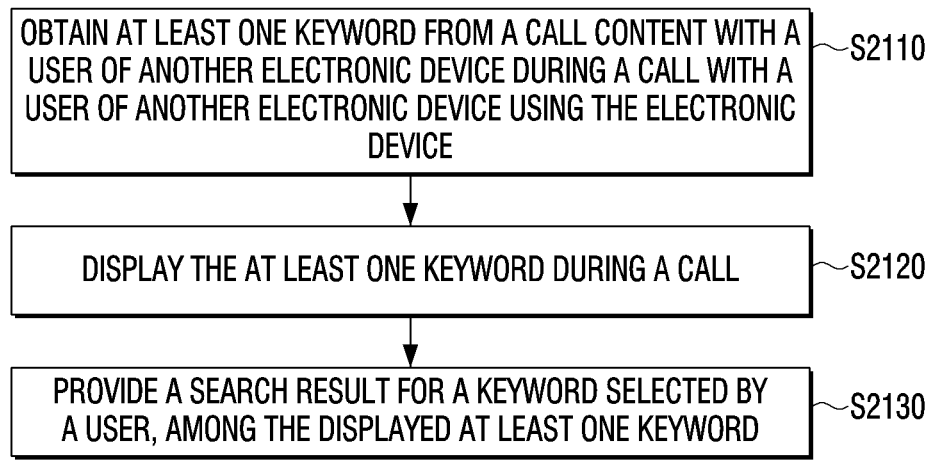
FIG. 21 is a flowchart illustrating a control method of an electronic device according to an embodiment.

FIG. 21 is a flowchart illustrating a method for controlling an electronic device according to an embodiment. The flowchart illustrated in FIG. 21 may be configured as operations processed in the electronic device 100 described herein. Accordingly, the contents described with respect to the electronic device 100 may be applied to the flowchart shown in FIG. 21, even if the contents are omitted below.

Referring to FIG. 21, at least one keyword is obtained from a call content with a user of another electronic device during a call with a user of another electronic device using the electronic device in operation S2110.

The at least one obtained keyword is displayed during a call in operation S2120.

The obtained keywords may be displayed on the call screen. According to an embodiment, the keyword may be automatically extinguished on a call screen according to an algorithm considering the frequency of mentioning of the key word and the last time of mentioning.

According to still another embodiment, a keyword on the call screen may able to move or disappear by a user interaction (move to a recycle bin using a long click).

A search result for a keyword selected by a user, among the displayed at least one keyword, is provided in operation S2130. Alternatively, a keyword selected by a user among at least one displayed keywords may be stored in the memo application.

The user may specify a plurality of keywords for searching or taking a memo. For example, when the initial keyword is touched, a keyword to be searched or taken to a memo together can be touched in order and designated, and the electronic device 100 may identify that the selection of the key word has been completed when a long touch is done in the last keyword, and may display a screen asking whether to search or take a memo by determining a set from an initially selected keyword to a lastly selected keyword.

The electronic device may predict a scenario which the user may perform after a call, and display a UI for asking the user whether to perform a task using the keyword. When the UI is selected, it is identified that the user agrees to the task performance, and the user may automatically perform the task of inputting the keyword to the application by utilizing the API.

According to the embodiments described above, the personalized recommendation information may be actively provided from the extracted keywords during a call without intervention of a user, thereby significantly reducing a series of processes performed by a user one by one during a call and after a call, and increasing efficiency and a user satisfaction. Also, a service that is more suitable to a context of use may be provided based on the call content.

The various example embodiments described above may be implemented in software, hardware, or the combination of software and hardware. By hardware implementation, the example embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, example embodiments described herein may be implemented by the processor 130 of the electronic device 100. According to a software implementation, example embodiments of the disclosure, such as the procedures and functions described herein may be implemented with separate software modules. Each of the above-described software modules may perform one or more of the functions and operations described herein.

Meanwhile, various embodiments of the disclosure may be implemented in software, including instructions stored on machine-readable storage media readable by a machine (e.g., a computer). A machine is a device operable to call an instruction from a storage medium and operable according to a called instruction and may include the electronic device 100 of the disclosed embodiments.

When the instruction is executed by a processor, the processor may perform the function corresponding to the instruction, either directly or under the control of the processor, using other components. The instructions may contain a code made by a compiler or a code executable by an interpreter. For example, by executing an instruction stored in the storage medium by a processor, the control method of the electronic device 100 may be executed. For example, by executing an instruction stored in a storage medium by a processor of a device (or an electronic device), a control method including (obtaining at least one keyword from a call content with a user of another electronic device during a call with a user of another electronic device using an electronic device, displaying the at least one keyword during a call, and providing a search result for a keyword selected by a user among the at least one displayed keywords may be performed.

Herein, the "non-transitory" storage medium may not include a signal but is tangible, and does not distinguish the case in which a data is semi-permanently stored in a storage medium from the case in which a data is temporarily stored in a storage medium.

According to an embodiment of the disclosure, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™, APP Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments of the disclosure, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device, the method comprising:
   during a call with a user of another electronic device by using the electronic device, obtaining at least one keyword from a content of the call with the user of the other electronic device, the obtaining of the at least one keyword being based on identifying a first occurrence of a noun and second occurrence of the noun in the content of the call, an interval between the first occurrence and the second occurrence being less than a preset time;
   determining a level of importance of the at least one keyword based on a number of times the at least one keyword is mentioned during the call;
   displaying the at least one keyword, based on the determined level of importance of the at least one keyword, on a call screen for the call with the user of the other electronic device during the call; and
   based on one from among the displayed at least one keyword being selected by a user input received during the call, transitioning, on the call screen for the call with the user of the other electronic device during the call, from displaying at least the selected keyword among the at least one keyword to providing a web search result for the selected keyword.

2. The method of claim 1, wherein the displaying of the at least one keyword comprises displaying at least one circular user interface (UI) element each including a different one of the at least one keyword.

3. The method of claim 2, wherein the displaying of the at least one circular UI element comprises displaying each of the at least one circular UI element with a different size based on the determined level of importance of the at least one keyword included therein.

4. The method of claim 1, wherein the displaying of the at least one keyword comprises, based on the obtained at least one keyword being a plurality of keywords, determining an arrangement interval of the plurality of keywords based on an interval mentioned in the call with the user of the other electronic device and displaying the plurality of keywords based on the determined arrangement interval.

5. The method of claim 1, further comprising:
   based on the displayed at least one keyword being a plurality of keywords, in response to receiving another user input to sequentially select two or more keywords from among the plurality of keywords, determining the selected two or more keywords as one set,
   wherein the providing of the web search result comprises providing the web search result for the determined set.

6. The method of claim 5, further comprising:
   displaying a first user interface (UI) component corresponding to a web search function for the determined set and a second UI component corresponding to a memo function for the determined set, wherein the providing of the web search result comprises, based on the first UI being selected, providing the web search result for the determined set.

7. The method of claim 6, further comprising:
based on the second UI component being selected, storing the determined set in a memo application.

8. The method of claim 1, wherein the obtaining of the at least one keyword comprises obtaining the at least one keyword from the content of the call with the user of the other electronic device using a learned artificial intelligence (AI) model.

9. The method of claim 1, further comprising:
based on the call with the user of the other electronic device being ended, determining a recommended application among a plurality of applications of the electronic device based on the obtained at least one keyword; and
displaying a user interface (UI) for asking whether to perform a task associated with the determined recommended application and the obtained at least one keyword.

10. An electronic device comprising:
a communicator;
a display;
memory storing one or more computer programs; and
one or more processors communicatively coupled to the communicator, the display, and the memory,
wherein the one or more computer programs include computer-executable instructions that, when executed by the one or more processors, cause the electronic device to:
during a call with a user of another electronic device by using the electronic device, obtain at least one keyword from a content of the call with the user of the other electronic device, the obtaining of the at least one keyword being based on identifying a first occurrence of a noun and second occurrence of the noun in the content of the call, an interval between the first occurrence and the second occurrence being less than a preset time,
determine a level of importance of the at least one keyword based on a number of times the at least one keyword is mentioned during the call,
display the at least one keyword, based on the determined level of importance of the at least one keyword, on a call screen for the call with the user of the other electronic device during the call, and
based on one from among the displayed at least one keyword being selected by a user input received during the call, transition, on the call screen for the call with the user of the other electronic device during the call, from displaying at least the selected keyword among the at least one keyword to providing a web search result for the selected keyword.

11. The electronic device of claim 10, wherein the one or more computer programs further include computer-executable instructions that, when executed by the one or more processors, cause the electronic device to:
display at least one circular user interface (UI) element each including a different one of the at least one keyword.

12. The electronic device of claim 11, wherein the one or more computer programs further include computer-executable instructions that, when executed by the one or more processors, cause the electronic device to:
display each of the at least one circular UI element with a different size based on the determined level of importance of the at least one keyword included therein.

13. The electronic device of claim 10, wherein the one or more computer programs further include computer-executable instructions that, when executed by the one or more processors, cause the electronic device to:
based on the obtained at least one keyword being a plurality of keywords, determine an arrangement interval of the plurality of keywords based on an interval mentioned in the call with the user of the other electronic device and display the plurality of keywords based on the determined arrangement interval.

14. The electronic device of claim 10, wherein the one or more computer programs further include computer-executable instructions that, when executed by the one or more processors, cause the electronic device to:
limit a number of displayed at least one keyword to a predetermined number.

15. The electronic device of claim 10, wherein the one or more computer programs further include computer-executable instructions that, when executed by the one or more processors, cause the electronic device to:
receive another user input to remove a keyword from among the displayed at least one keyword, and
in response to the received other user input to remove the keyword from among the displayed at least one keyword, remove the keyword among the displayed at least one keyword and display a new keyword having a lesser level of importance less than that of the removed keyword.

16. The electronic device of claim 10, wherein the one or more computer programs further include computer-executable instructions that, when executed by the one or more processors, cause the electronic device to:
based on the displayed at least one keyword being a plurality of keywords, in response to receiving another user input to sequentially select two or more keywords from among the plurality of keywords, determine the selected two or more keywords as one set, and
provide the web search result for the determined set.

17. The electronic device of claim 16, wherein the one or more computer programs further include computer-executable instructions that, when executed by the one or more processors, cause the electronic device to:
display a first user interface (UI) component corresponding to a web search function for the determined set and a second UI component corresponding to a memo function for the determined set, and
based on the first UI being selected, provide the web search result for the determined set.

18. The electronic device of claim 17, wherein the one or more computer programs further include computer-executable instructions that, when executed by the one or more processors, cause the electronic device to:
based on the second UI component being selected, store the determined set in a memo application.

19. The electronic device of claim 10, wherein the one or more computer programs further include computer-executable instructions that, when executed by the one or more processors, cause the electronic device to:
obtain the at least one keyword from the content of the call with the user of the other electronic device using a learned artificial intelligence (AI) model.

20. The electronic device of claim 10, wherein the one or more computer programs further include computer-executable instructions that, when executed by the one or more processors, cause the electronic device to:

based on the call with the user of the other electronic device being ended, determine a recommended application among a plurality of applications of the electronic device based on the obtained at least one keyword, and display a user interface (UI) for asking whether to perform a task associated with the determined recommended application and the obtained at least one keyword.

21. One or more non-transitory computer-readable storage media storing one or more computer programs including computer-executable instructions that, when executed by one or more processors of an electronic device, cause the electronic device to perform operations, the operations comprising:

during a call with a user of another electronic device by using the electronic device, obtaining at least one keyword from a content of the call with the user of the other electronic device, the obtaining of the at least one keyword being based on identifying a first occurrence of a noun and second occurrence of the noun in the content of the call, an interval between the first occurrence and the second occurrence being less than a preset time;

determining a level of importance of the at least one keyword based on a number of times the at least one keyword is mentioned during the call;

displaying the at least one keyword, based on the determined level of importance of the at least one keyword, on a call screen for the call with the user of the other electronic device during the call; and based on one from among the displayed at least one keyword being selected by a user input received during the call, transitioning, on the call screen for the call with the user of the other electronic device during the call, from displaying at least the selected keyword among the at least one keyword to providing a web search result for the selected keyword.

\* \* \* \* \*